(12) United States Patent
Spaulding et al.

(10) Patent No.: US 8,098,403 B2
(45) Date of Patent: *Jan. 17, 2012

(54) COLOR ERROR DIFFUSION WITH ERROR SIGNAL OFFSET

(75) Inventors: Kevin E. Spaulding, Spencerport, NY (US); Douglas W. Couwenhoven, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,063

(22) Filed: May 11, 2011

(65) Prior Publication Data

US 2011/0211229 A1 Sep. 1, 2011

Related U.S. Application Data

(63) Continuation of application No. 12/275,705, filed on Nov. 21, 2008, now Pat. No. 7,982,916.

(51) Int. Cl.
  *H04N 1/405* (2006.01)
  *H04N 1/56* (2006.01)

(52) U.S. Cl. ...... 358/3.03; 358/3.05; 358/534; 382/162; 382/252

(58) Field of Classification Search .................. 358/3.03, 358/3.04, 3.05, 534, 1.9; 382/162, 252; 345/597, 345/616
See application file for complete search history.

(56) References Cited

U.S. PATENT DOCUMENTS

| 5,375,002 | A  | 12/1994 | Kim et al. |
| 5,565,994 | A  | 10/1996 | Eschbach et al. |
| 5,757,517 | A  | 5/1998 | Couwenhoven et al. |
| 6,307,647 | B1 | 10/2001 | Cheung et al. |
| 6,637,851 | B2 | 10/2003 | VandeVelde et al. |
| 7,362,472 | B2 | 4/2008 | Couwenhoven et al. |
| 7,369,276 | B2 | 5/2008 | Couwenhoven et al. |
| 7,564,589 | B2 | 7/2009 | Spaulding et al. |
| 2005/0195437 | A1 | 9/2005 | Couwenhoven et al. |
| 2008/0055649 | A1 | 3/2008 | Spaulding et al. |

*Primary Examiner* — Kimberly A Williams
(74) *Attorney, Agent, or Firm* — Raymond L. Owens

(57) ABSTRACT

A method for multi-toning an input digital image having input pixels with two or more color channels to form an output digital image having modified output levels. The method includes determining modified output levels using a combined error signal formed from intermediate error signals for each color channel together with an error signal offset value, and adjusting the input levels for the nearby pixels responsive to weighted error signals.

12 Claims, 15 Drawing Sheets

COLOR ERROR DIFFUSION WITH ERROR SIGNAL OFFSET

CROSS REFERENCE TO RELATED APPLICATION

This application is a continuation of commonly-assigned U.S. Ser. No. 12/275,705 filed Nov. 21, 2008 now U.S. Pat. No. 7,982,916 (U.S. Patent Application Publication 2010/0128313) entitled "Color Error Diffusion With Error Signal Offset" by Kevin E. Spaulding et al, the disclosure of which is incorporated herein.

FIELD OF THE INVENTION

The present invention relates to the field of digital image processing, and more particularly to a method for digitally halftoning a continuous-tone image using error diffusion.

BACKGROUND OF THE INVENTION

Digital halftoning is a technique employing digital image processing to produce a halftone output image from a continuous-tone input image. In the digital halftoning technique, a continuous-tone image is sampled, for example, with a scanner or digital camera, and the samples are digitized and stored in a computer. The digitized samples (or "pixels") include discrete code values having $N_i$ possible input levels (typically $N_i$=256, with code values ranging from 0 to 255). To reproduce this image with high quality on an output device which can print $N_o$ output levels, where $N_o<N_i$, it is necessary to produce the sensation of intermediate gray levels by suitably distributing the printed dots in the output image using some form of halftoning technique. One example of an output device requiring halftoning is an inkjet printer, which ejects a volume of ink at each output pixel to reproduce the image. The number of output levels ($N_o$) of the printer is the number of possible volumes deposited at each pixel (including 0), and is typically in the range of 2-32.

One prior art method of digital halftoning is known as error diffusion. FIG. 1 shows a block diagram describing a basic error diffusion technique. The continuous-tone input level for one pixel of the input image is shown as X. For purposes of illustration it will be assumed that the continuous-tone input level spans the range from 0 to 255. The input level X is added to a weighted error signal $X_{fe}$ using a summer 10 to produce a modified input level $X_{in}$. (The generation of the weighted error signal $X_{fe}$ will be discussed shortly.) The modified input level $X_{in}$ for the current pixel is quantized using a quantizer 20 to form the quantized output level $X_o$. For a binary error diffusion algorithm, the quantizer 20 will output a 0 for any input level below a threshold (typically code value 128), and a 255 for any input level above the threshold. A summer 30 receives the modified input level $X_{in}$ and the quantized output level $X_o$ and produces an error signal $X_{err}$ representing the error introduced by the quantization process. The error signal $X_{err}$ is multiplied by a series of error feedback weights using a weighted error generator 40 to produce the weighted error signal $X_{fe}$, which is added to the continuous-tone input levels of nearby pixels which have yet to be processed using summer 10. The propagation of the errors made during the quantization process to the nearby pixels insures that the arithmetic mean of the pixel values is preserved over a local image region.

FIG. 2 shows a typical set of error feedback weights used in the prior art. The error for the current pixel, located at (column,row)=(i,j) of the image, is weighted by the error feedback weights, and added to nearby pixels yet to be processed. In this example, there are four error feedback weights having the same value of ¼, with the sum of the error feedback weights being 1. This ensures that the arithmetic mean of the image is preserved.

When using the standard error diffusion algorithm to process a color image, a technique common in the prior art is to apply the error diffusion algorithm independently to each color channel. See, for example, U.S. Pat. No. 5,757,517 to Couwenhoven, et al. This arrangement is shown for processing an image with cyan (C), magenta (M), and yellow (Y) color channels in FIG. 3. This arrangement is successful at preserving the arithmetic mean of the image data in each color channel, resulting in the correct output color, but suffers from the fact that the placement of the output dots in each color channel is decorrelated, and overprints can unnecessarily occur, resulting in an undesirable noisy, grainy appearance to the printed image. To illustrate this, consider that a 16×16 pixel image containing a 30% tint of uniform CMY code values is to be halftoned to 2 levels (on, off) and printed on an inkjet printer. As shown in FIG. 4, the CMY color channels, when processed independently with the error diffusion algorithm, produce dot patterns that typically resemble the cyan, magenta, and yellow patterns shown as patterns 50, 60, and 70, respectively. In these patterns, the black pixels indicate locations where an ink dot will be printed, and white locations indicate white paper. When these three patterns are printed on top of each other on the page, an output pattern 80 will result. (Due to the black and white reproduction of output pattern 80 in this document, only the luminance of the pattern is shown). Each pixel in the output pattern 80 can be one of eight colors: white; C; M; Y; red (C+Y); green (C+Y); blue (C+M); or black (C+M+Y). The luminance modulation between the darker pixels (R, G, B, or black) and the lighter pixels (white, C, M, or Y) produces an undesirable grainy appearance to the human eye. Interestingly, this is not necessary, since the original input image was a 30% tint of CMY, therefore it should have been possible to produce the output image using non-overlapping patterns such that only white, C, M, or Y are produced at each pixel. The luminance modulation between these colors would be much less, providing a more pleasing result.

Error diffusion methods that attempt to provide correlation between the color channels are known in the prior art. These algorithms are sometimes called "vector error diffusion" algorithms. Chapter 16 of "Digital Color Halftoning", by H. Kang (SPIE Optical Engineering Press, 1999) describes several vector error diffusion techniques. U.S. Pat. No. 5,375,002 to Kim, et al., discloses a color error diffusion method in which an error look-up table is used to help determine the color of an output pixel. U.S. Pat. No. 5,565,994 to Esbach discloses an error diffusion method in which output signals from one color channel are used to determine threshold values for other color channels to provide some decorrelation between the color channels. U.S. Pat. No. 6,637,851 to Van de Velde, et al., discloses an error diffusion method in which a luminance signal is computed and separately error diffused as an additional channel. The luminance information is then used to guide the selection of the output pixel colors. Typically, the prior art methods are computationally complex, requiring substantial additional processing power or memory.

In U.S. Patent Application Publication No. 2008/0055649, Spaulding et al. have disclosed an error diffusion algorithm incorporating error signal offsets which provides significant image quality improvements with only a modest increase in the computational complexity relative to prior art algorithms. (This algorithm will be discussed in more detail later.) However, it has been found that even this algorithm can run 20-40% slower than algorithms that do not use error signal offsets.

Therefore, there is a need for a color error diffusion method which provides for high quality printed images with reduced graininess, and can be implemented efficiently without requiring substantial additional computing power or memory.

SUMMARY OF THE INVENTION

It is an object of the present invention to provide printed color images with reduced graininess.

It is a further object of the present invention to provide for improved quality of printed color images while reducing the amount of computer memory and computer processing power required to process the images.

Still another object of the present invention is to provide for high quality color images when printed on an inkjet printer.

Still another object of the present invention is to reduce the start-up artifacts generally associated with error diffusion algorithms.

These objects are achieved by a color error diffusion method for multi-toning an input digital image having input pixels with input levels for two or more color channels, each color channel, C, having a specified number of input levels, $N_i$, to form an output digital image having output pixels with output levels, each color channel of the output digital image having a specified number of output levels, $N_o$, where $2 \leq N_o < N_i$, comprising:

(a) determining intermediate output levels for each color channel by applying a quantization step to the input levels for the corresponding color channels of an input pixel;

(b) determining intermediate error signals for each color channel responsive to the input levels and intermediate output levels;

(c) determining an error signal offset value as a function of the input levels of the input pixel;

(d) combining the error signal offset value and the intermediate error signals for each color channel to produce a combined error signal;

(e) sorting the intermediate error signals for each color channel to produce a set of sorted error signals;

(f) determining output levels for each color channel of the output pixel responsive to the intermediate output levels, the combined error signal, and the sorted error signals;

(g) determining error signals for each color channel responsive to the input levels and output levels;

(h) weighting the error signals for each color channel to form weighted error signals and adjusting the input levels for the nearby pixels; and (i) repeating steps (a)-(h) for multiple input pixels of the input digital image to thereby provide the output digital image.

The present invention has an advantage over the prior art in that it provides for improved image quality in printed images by providing for reduced graininess in the printed image. It has the further advantage that it has reduced start-up artifacts for image regions where the input levels have an abrupt transition. The improved image quality is obtained using minimal extra computing resources, such as memory and CPU cycles. This permits the invention to be implemented efficiently so it can be applied in a large number of applications, including those with limited processing power or memory. It has the additional advantage that it is more computationally efficient than another prior art error diffusion algorithm that produces similar image quality benefits.

DETAILED DESCRIPTION OF THE INVENTION

This invention describes a method for halftoning a digital image using a color error diffusion method in which the output dot patterns are decorrelated for the color channels. This shows that overprints of the printer's colorants will be reduced, producing a printed image with reduced graininess.

A preferred embodiment of the error diffusion algorithm described by Couwenhoven et al. in U.S. Patent Application Publication No. 2008/0055649 entitled "Color Error Diffusion with Error Signal Offsets" will now be described. The invention will be described as applied to a color image having three color channels, corresponding to cyan (C), magenta (M), and yellow (Y) colorants. It will be understood by one skilled in the art that the invention applies equally well to printers having different colorants, as well as printers having more colorants, such as a CMYK ink set typically found in inkjet printers. The method of Couwenhoven et al. will also be described in the context of a binary inkjet printer which can print either 0 or 1 drops of ink of each color at each pixel, but the fundamental aspects of the invention apply to any printing technology in which a halftoning (or multi-level halftoning using more than 2 output levels) step is employed. Multi-level halftoning is often referred to in the art as multi-toning.

Figure 5:
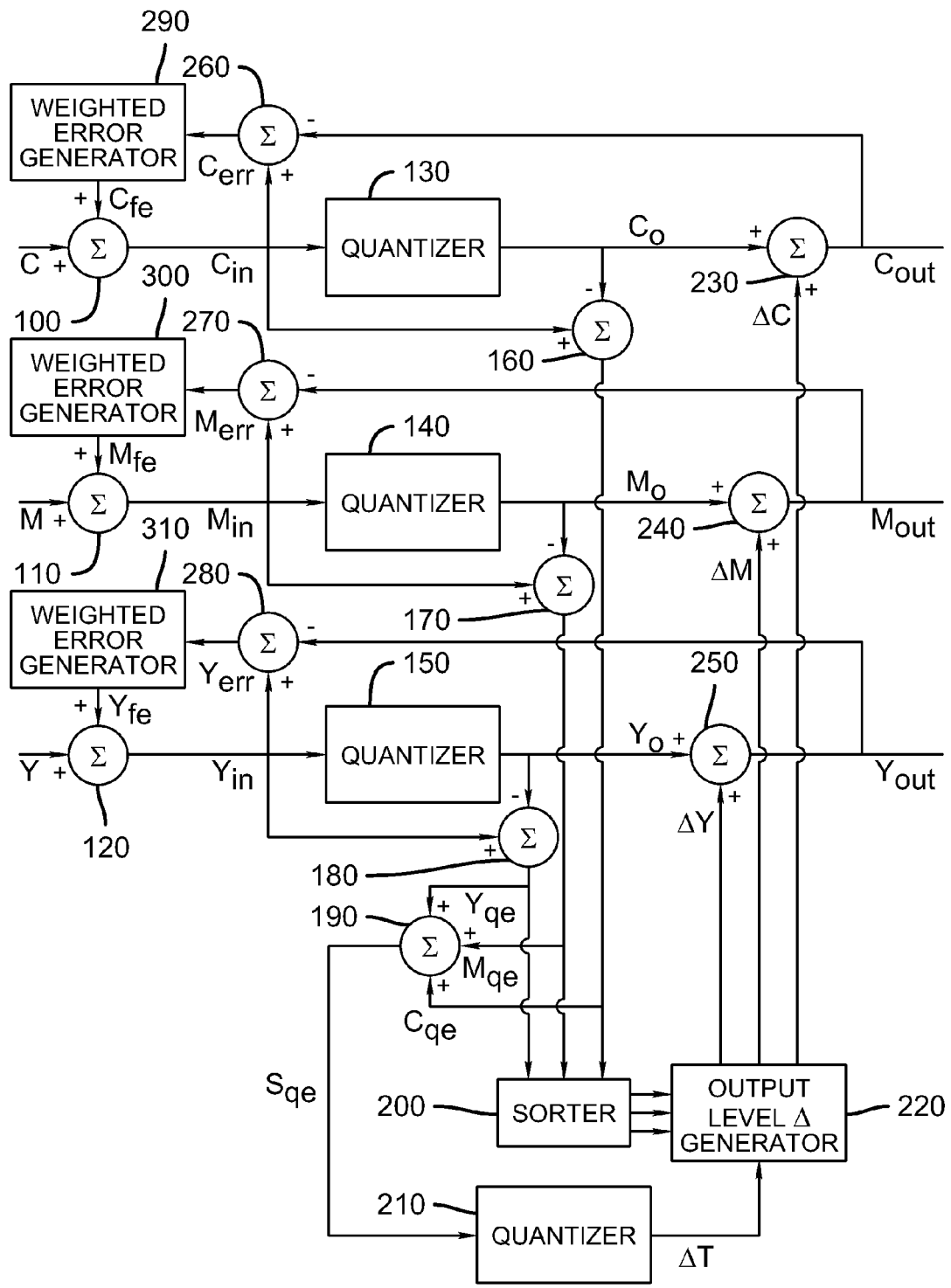
FIG. 5 is a flow diagram showing a prior art color error diffusion algorithm that uses error signal offsets.

Turning to FIG. 5, the fundamental aspects of a preferred embodiment of the method of Couwenhoven et al. will now be described. FIG. 5 is a flow diagram showing the logic flow of a preferred embodiment of the color error diffusion method disclosed by Couwenhoven et al. In this example, continuous-tone input values for an image having CMY color channels are shown by the signals C, M, and Y, respectively, entering the diagram on the left. The input level C, M, or Y is added to a weighted error signal ($C_{fe}$, $M_{fe}$, or $Y_{fe}$ respectively) using summers 100, 110, and 120 to produce modified input levels $C_{in}$, $M_{in}$, and $Y_{in}$ according to:

$$Cin = C + Cfe$$

$$Min = M + Mfe$$

$$Yin = Y + Yfe. \qquad (1)$$

(The generation of the weighted error signals $C_{fe}$, $M_{fe}$, and $Y_{fe}$ will be discussed shortly.) The modified input levels $C_{in}$, $M_{in}$, and $Y_{in}$ for the current pixel are quantized using quantizers 130, 140, and 150 to form the quantized output levels $C_o$, $M_o$, and $Y_o$. The function of the quantizers 130, 140, and 150 are to select the nearest available output level less than or equal to the input level for each color channel. (Alternatively, the quantizers 130, 140, and 150 can be adapted to select the nearest available output level.) In a preferred embodiment, the quantizers 130, 140, and 150 are implemented using a look-up table indexed with the input level, which returns the desired output level directly. The construction of this form of quantization look-up table will be understood by one skilled in the art. In another embodiment of the method of Couwenhoven et al., the quantizers 130, 140, and 150 are implemented using an integer division operation, as follows. The modified input level is divided by the quantization interval size, and the integer portion of the result is used as the quantized output level, according to:

$$Q = (Ni - 1)/(No - 1)$$

$$Co = \text{int}(Cin/Q)$$

$$Mo = \text{int}(Min/Q)$$

$$Yo = \text{int}(Yin/Q) \qquad (2)$$

where:
Q is the quantization interval size;
$N_i$ is the number of possible input levels;
$N_o$ is the number of possible output levels; and
$2 \leq N_o < N_i$, and int( ) is the integer function.

Still referring to FIG. 5, after the quantized output levels are determined, summers 160, 170, and 180 are used to compute an intermediate error signal for each color channel according to:

$$Cqe = Cin - Co$$

$$Mqe = Min - Mo$$

$$Yqe = Yin - Yo. \qquad (3)$$

The intermediate error signal for each color channel represents the difference between the input level and the quantized output level for each color channel caused by the quantizers. Since the number of input levels, $N_i$, and the number of output levels, $N_o$, are different, then it is important to compute the intermediate error signals between appropriately scaled versions of the input level and quantized output levels. For example, if we have $N_i = 256$ input levels, and $N_o = 2$, then for purposes of computing the intermediate error signal, in a preferred embodiment, the output levels that are used are 0 and 255, instead of 0 and 1. In other words, the input level and the quantized output level need to be scaled to the same data range for computing the intermediate error signals. This will be well understood by one skilled in the art. In another embodiment of the method of Couwenhoven et al., the intermediate error signals $C_{qe}$, $M_{qe}$, and $Y_{qe}$ can be computed using an integer division operation, as follows. The modified input level is divided by the quantization interval size (as computed earlier), and the remainder portion of the result is used as the intermediate error signal, according to:

$$Cqe = \text{rem}(Cin/Q)$$

$$Mqe = \text{rem}(Min/Q)$$

$$Yqe = \text{rem}(Yin/Q) \qquad (4)$$

where rem( ) is the remainder function, which returns the portion remaining after the integer division of the argument (e.g., rem(27/5)=2).

After they are determined, the intermediate error signals $C_{qe}$, $M_{qe}$, and $Y_{qe}$ are then input to a summer 190 to produce a combined error signal $S_{qe}$ according to:

$$S_{qe} = C_{qe} + M_{qe} + Y_{qe}. \qquad (5)$$

The quantized output levels represent the "number of output levels" that will be turned on at the current pixel. For example, in the case of a binary printer, $\{C_o, M_o, Y_o\} = \{255, 0, 0\}$ means that one output level will be used at this pixel, and it will result in a cyan dot being printed. The combined error signal represents the total number of "extra" output levels that are needed to preserve the arithmetic mean of the image. For example, if $\{C_{qe}, M_{qe}, Y_{qe}\} = \{51, 179, 93\}$, then $S_{qe} = 323$, which means that 323/255=1.27 "extra" output levels are needed at this pixel. Exactly how to incorporate the extra output levels represented by the combined error signal is discussed hereinbelow.

The intermediate error signals, $C_{qe}$, $M_{qe}$, and $Y_{qe}$, passed to a sorter 200 which sorts the intermediate error signals into a set of sorted error signals. In a preferred embodiment of the method of Couwenhoven et al., the intermediate error signals are sorted in descending order from largest to smallest. The combined error signal, $S_{qe}$, is input to a quantizer 210 which outputs a total output level increment, $\Delta T$. The quantizer 210 is preferably implemented using a look-up table indexed by the combined error signal, $S_{qe}$, and outputs the total output level increment, $\Delta T$, directly. In another embodiment, the quantizer 210 can be implemented using integer division as follows. The modified input level is divided by the quantization interval size, and the integer portion of the result is used as the quantized output level, according to:

$$\Delta T = \text{int}(S_{qe}/Q) \qquad (6)$$

where Q is the quantization interval size, as described earlier. Thus, $\Delta T$ represents the integer number of "extra" levels that are needed at this pixel. Using $\{C_{qe}, M_{qe}, Y_{qe}\} = \{51, 179, 93\}$, and $S_{qe} = 323$, the total output level increment is computed as $\Delta T = \text{int}(323/255) = 1$. Thus, in this example, it is desired to increment the output level for one of the colors at this pixel.

Still referring to FIG. 5, an output level delta generator 220 receives the total output level increment, $\Delta T$, from the quantizer 210 and the set of sorted error signals from sorter 200. The color channel having the largest intermediate error signal, which corresponds to the first entry in the set of sorted error signals, is the color channel that is in the most "need" of having the output level incremented. In other words, the color channel with the largest intermediate error signal is the first one that should be incremented, and ΔT represents the integer number of extra output levels that are desired. Thus, according to a preferred embodiment, the output level delta generator 220 computes output level increments ΔC, ΔM, and ΔY to increment the first ΔT color channels in the sorted error signal list by one output level. Using $\{C_{qe}, M_{qe}, Y_{qe}\}=\{51, 179, 93\}$, the set of sorted error signals would be $\{M_{qe}, Y_{qe}, C_{qe}\}=\{179, 93, 51\}$, indicating that magenta was in the most need of having its output level incremented. In the example, ΔT=1, so output level increments of $\{\Delta C, \Delta M, \Delta Y\}=\{0, 255, 0\}$ would be computed by the output level delta generator 220. In a preferred embodiment the sorter 200 need only perform a partial sort of the intermediate error signals, since it will be common that only the one or two largest signals will need to be identified. In the current example, ΔT=1, so only the color channel with the largest intermediate error signal need be identified. This provides for a significant savings in computing time, since the sorting operation implemented by the sorter 200 generally requires noticeable extra processing time to execute.

Once the output level increments ΔC, ΔM, and ΔY are determined, they are passed along to summers 230, 240, and 250 respectively, wherein modified output levels $C_{out}$, $M_{out}$, and $Y_{out}$ are computed according to:

$$C_{out}=C_0+\Delta C$$

$$M_{out}=M_0+\Delta M$$

$$Y_{out}=Y_0+\Delta Y. \quad (7)$$

The modified output levels $C_{out}$, $M_{out}$, and $Y_{out}$ represent the actual output levels that are printed on the page. Once they are computed, the modified output levels $C_{out}$, $M_{out}$, and $Y_{out}$ are input to summers 260, 270, and 280 respectively, which also receive the modified input levels $C_{in}$, $M_{in}$, and $Y_{in}$, respectively, to produce error signals $C_{err}$, $M_{err}$, and $Y_{err}$ according to:

$$C_{err}=C_{in}-C_{out}$$

$$M_{err}=M_{in}-M_{out}$$

$$Y_{err}=Y_{in}-Y_{out}. \quad (8)$$

Figure 1:
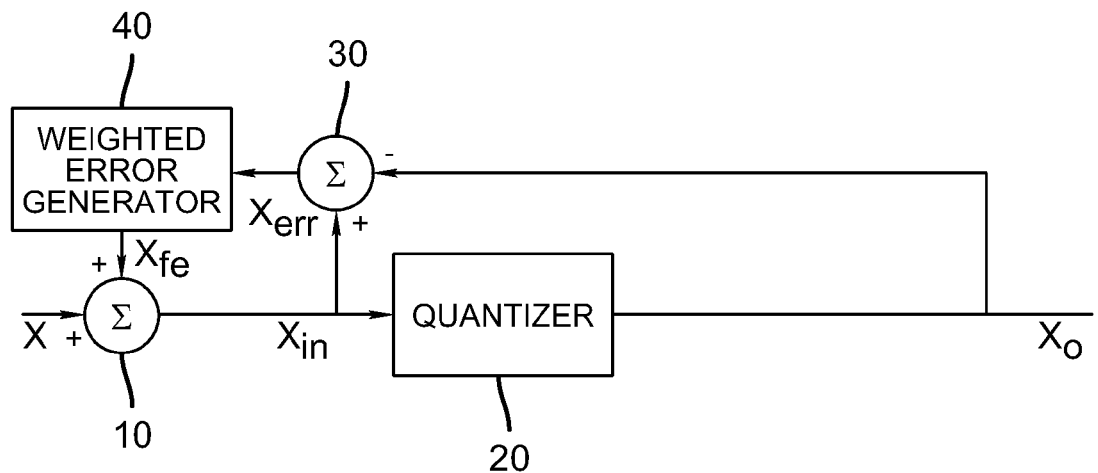
FIG. 1 is a flow diagram showing the functioning of a standard error diffusion algorithm according to the prior art.
Figure 2:
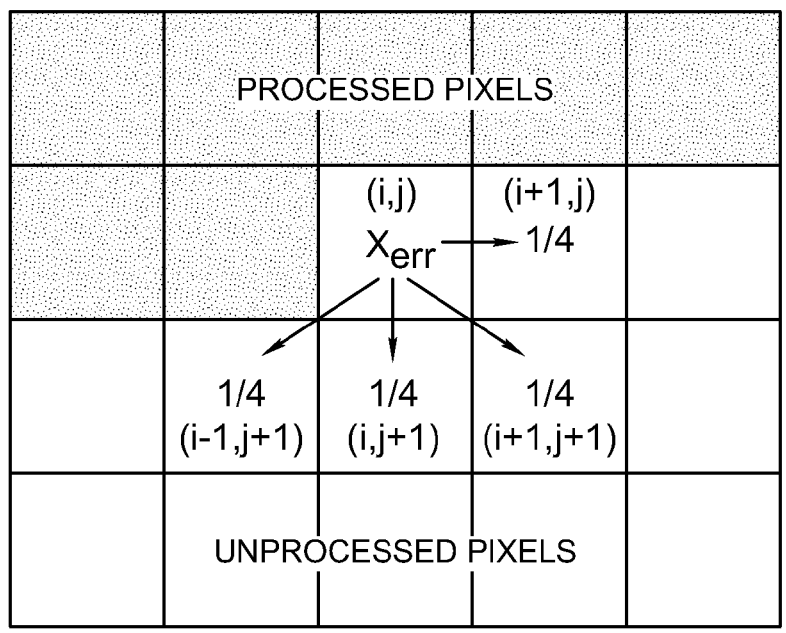
FIG. 2 is diagram showing a typical set of error feedback weights according to the prior art.
Figure 3:
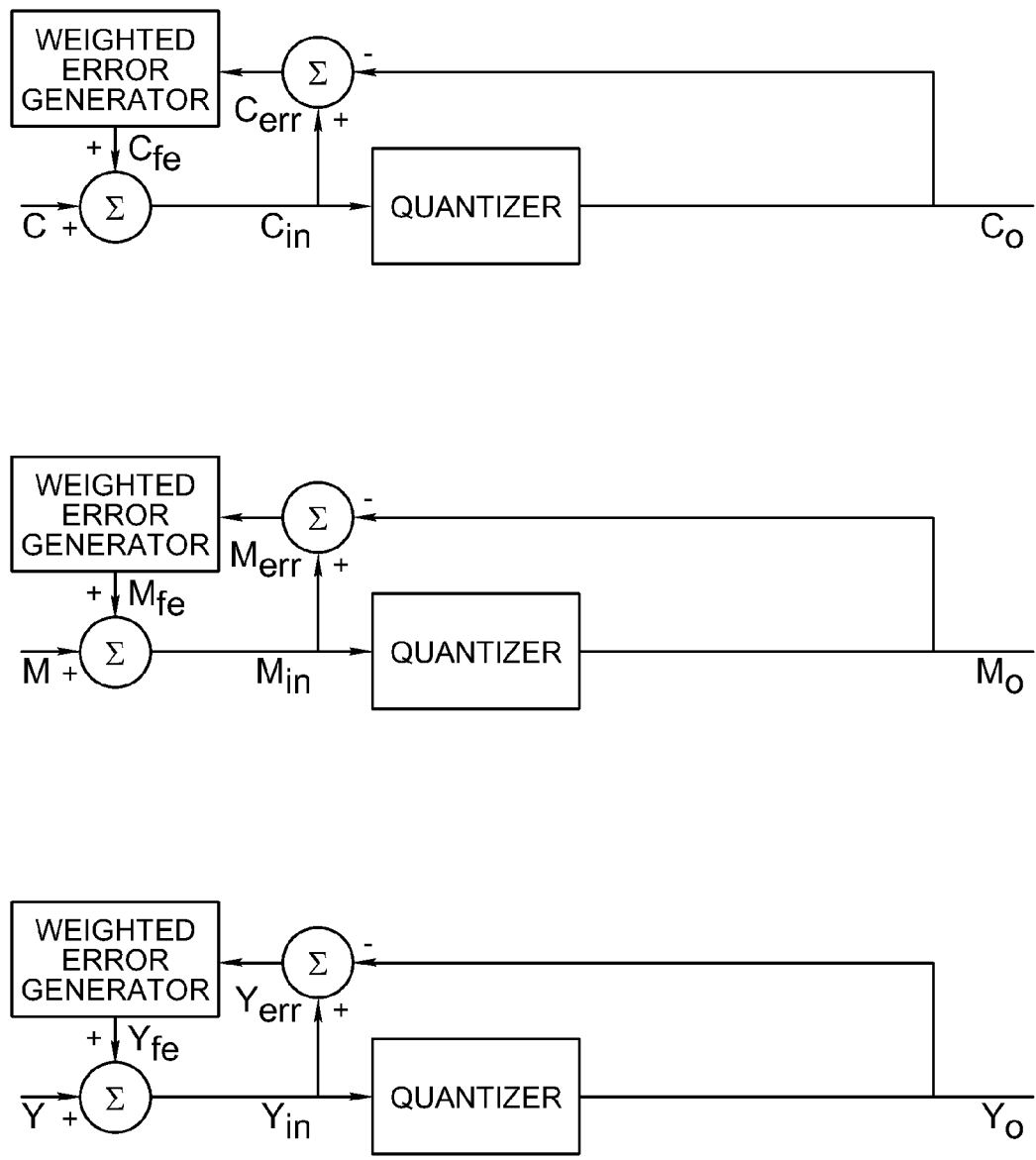
FIG. 3 is a flow diagram showing the functioning of a standard error diffusion algorithm applied to a color image according to the prior art.
Figure 4:
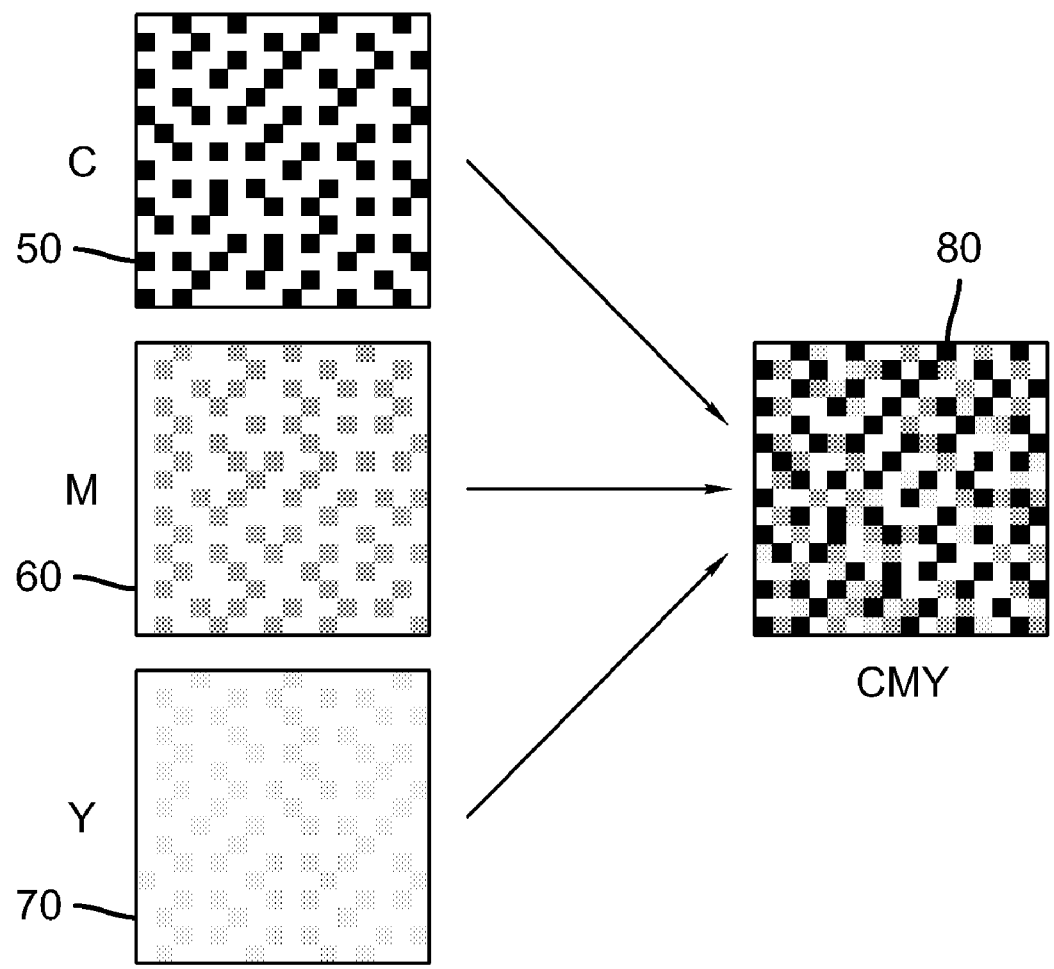
FIG. 4 is a diagram showing example color separation and overprint patterns according to a prior art color error diffusion algorithm.

The error signal for each color channel represents the difference between the modified input level and the modified output level for each color channel caused by the entire color error diffusion process. (As before, since the number of input levels, $N_i$, and the number of output levels, $N_o$, are different, then it is important to compute the error signals between appropriately scaled versions of the modified input level and modified output levels). Once determined, the error signals for each color channel are input to weighted error generators 290, 300, and 310. The weighted error generators perform the function of distributing the error to nearby pixels in the corresponding color channel that have yet to be processed, as described earlier. In a preferred embodiment, the weighted error generator will distribute the error signal for each color channel to input pixels to the right or below the current input pixel in the image, as shown in FIG. 2. Those skilled in the art will recognize that many different error feedback weights can be applied within the scope of the invention, including using different weights or a different number of weights spanning a larger or smaller region of input pixels, and that the selection of the particular error feedback weights is not fundamental to the invention. The weighted error generators 290, 300, and 310 produce weighted error signals $C_{fe}$, $M_{fe}$, and $Y_{fe}$, respectively. The weighted error signals are then added to the input levels C, M, and Y of nearby pixels that have yet to be processed using summers 100, 110, and 120, and processing continues with the next pixel in the image.

Figure 6:
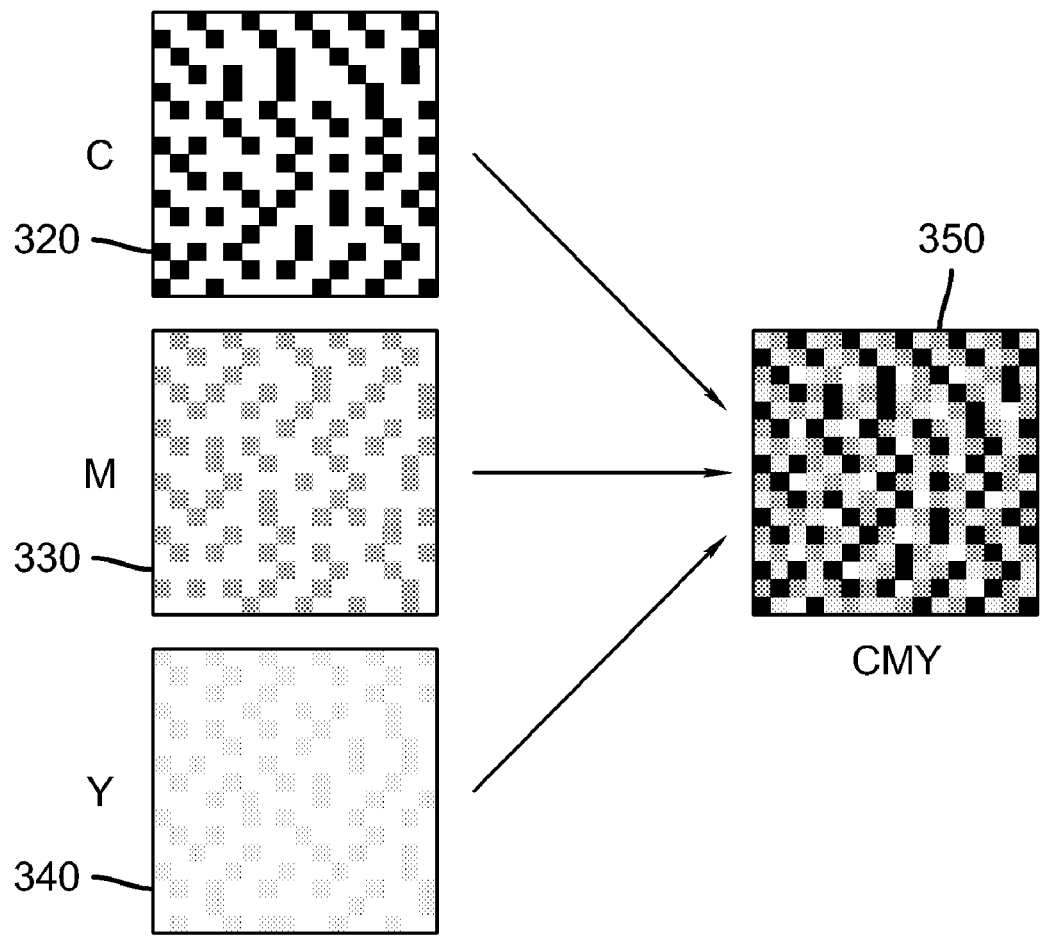
FIG. 6 is a diagram showing example color separation and overprint patterns according to a prior art color error diffusion algorithm.

Turning now to FIG. 6, consider that the same 16×16 pixel image containing a 30% tint of uniform CMY code values described earlier is now to be halftoned to 2 levels (on, off) and printed on an inkjet printer using the method of the method of Couwenhoven et al. As shown in FIG. 6, the CMY color channels, when processed in accordance with the method of Couwenhoven et al., produce cyan, magenta, and yellow dot patterns 320, 330, and 340, respectively. In these patterns, the black pixels indicate locations where an ink dot will be printed, and white locations indicate white paper. When these three patterns are printed on top of each other on the page, an output pattern 350 will result. (Due to the black and white reproduction of output pattern 350 in this document, only the luminance of the pattern is shown). Each pixel in the output pattern 350 is now reproduced with only one of the lighter pixels (white, C, M, or Y), which produces a less grainy appearance to the human eye when compared to the prior art CMY dot pattern 80. The method of Couwenhoven et al. achieves this pleasing result without requiring substantial extra computer memory or processing power, thereby providing an advantage over the prior art.

Figure 7:
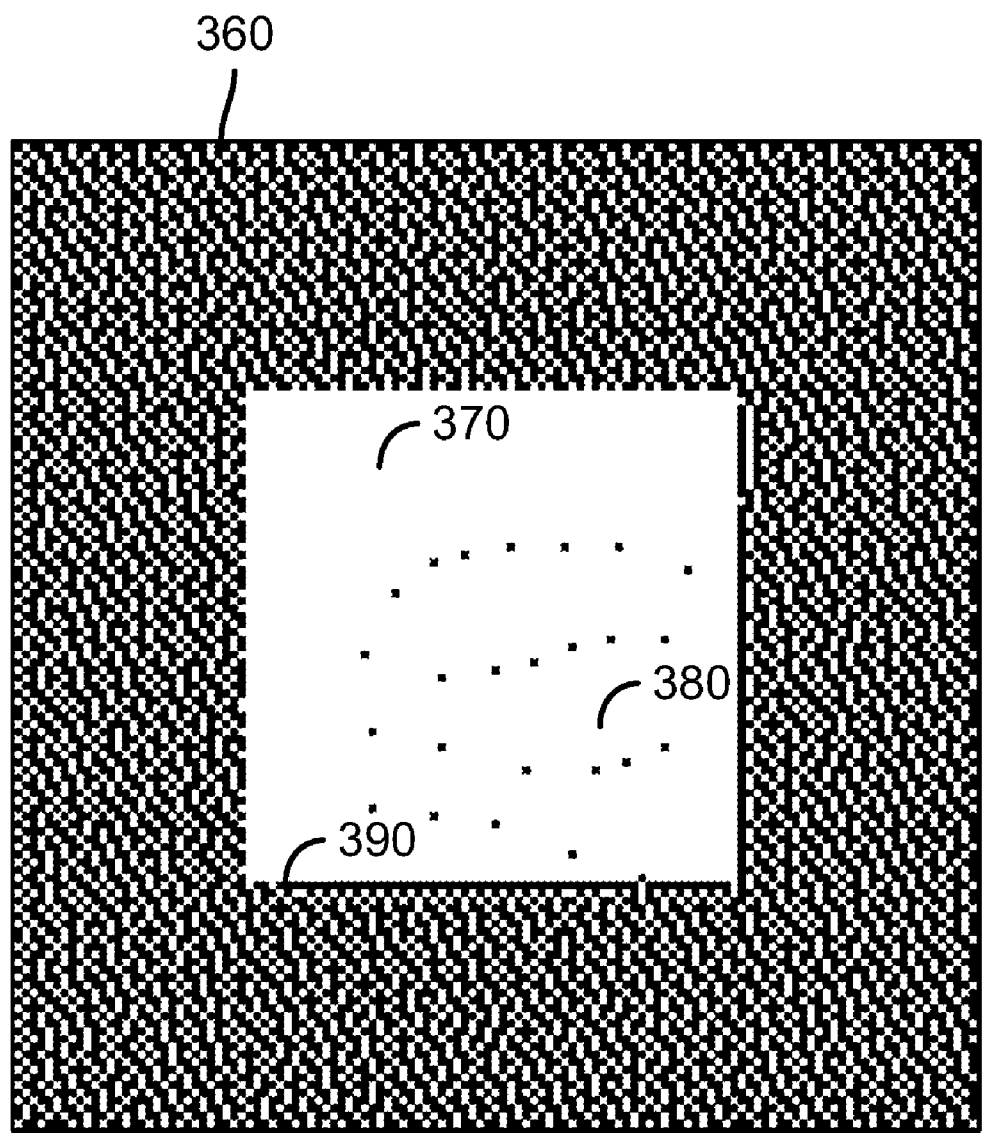
FIG. 7 shows a sample image displaying start-up artifacts.

One artifact that is characteristic of many types of error diffusion algorithms, including the one that has been disclosed here, are "start-up" artifacts that occur when there are abrupt changes in the tone level of the image. Consider for example a light square in the middle of a darker background as shown in FIG. 7. In this example, the darker image region 360 has about 60% of the dots turned on, and the lighter image region in the center has about 1% of the dots turned on. A start-up artifact region 370 can be observed on the top and left edges of the lighter image region. After some number of image pixels, the halftone algorithm stabilizes and produces an equilibrium image region 380. Another start-up artifact region 390 can also be seen where the image goes from the light square back to the darker background, although this region is smaller in extent.

Figure 8:
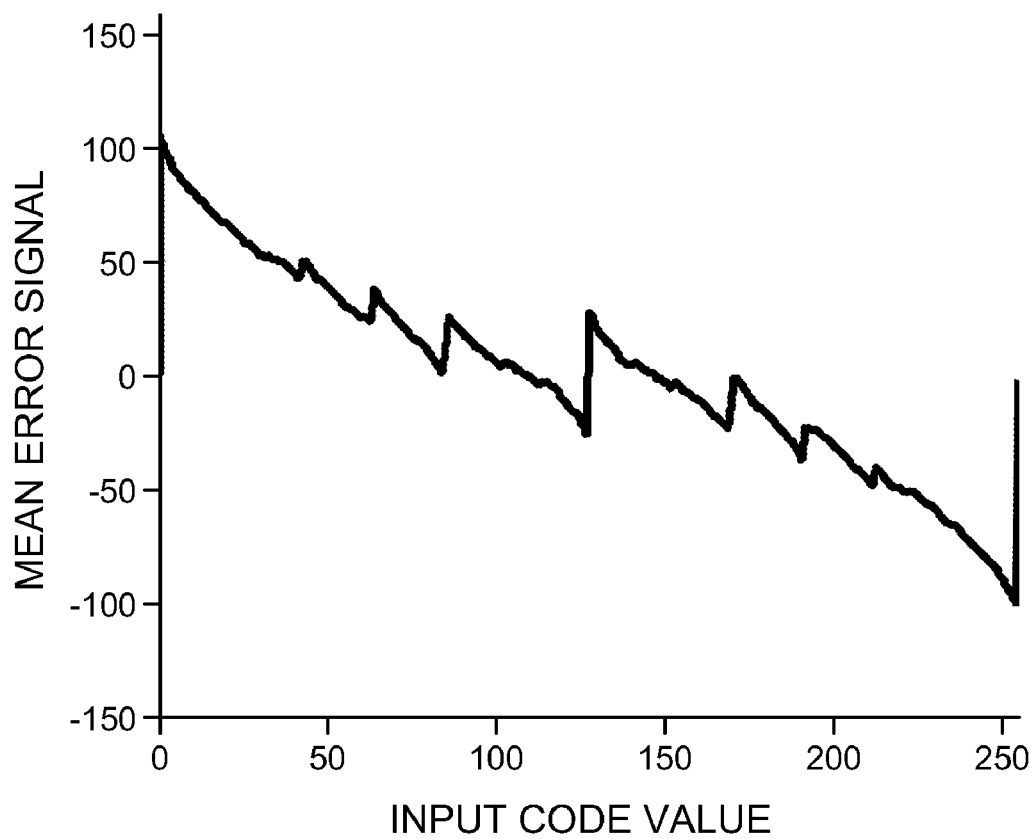
FIG. 8 is a graph showing the mean error signal as a function of input code value.

Start-up artifacts can be traced to the fact that the average error signal generated by error diffusion algorithms tends to be a function of the input tone level. FIG. 8 shows a graph of the average error signal level associated with halftoning a pure magenta grayscale using the method of the method of Couwenhoven et al. as shown in FIG. 5. This graph was generated by averaging the error signal associated with a set of 256 different patches having different tone levels. The error signals were sampled from the lower right corners of the patches in order to avoid any start-up artifact regions. It can be seen that both the magnitude and sign of the average error signal changes quite significantly with tone level. Therefore, when an image changes abruptly from one tone level to another, it takes awhile for the errors to accumulate enough to reach the new equilibrium state. The shape of the average error signal graph will be a function of the exact form of the error diffusion algorithm, as well as the size and shape of the error feedback filter.

Li et al. in U.S. Pat. No. 6,563,957 have noted that the start-up artifacts of this type can be reduced significantly for single channel error diffusion operations by incorporating a tone-dependent threshold operation. However, the method that they propose is not applicable for configurations which involve simultaneously processing a plurality of color channels.

Figure 9:
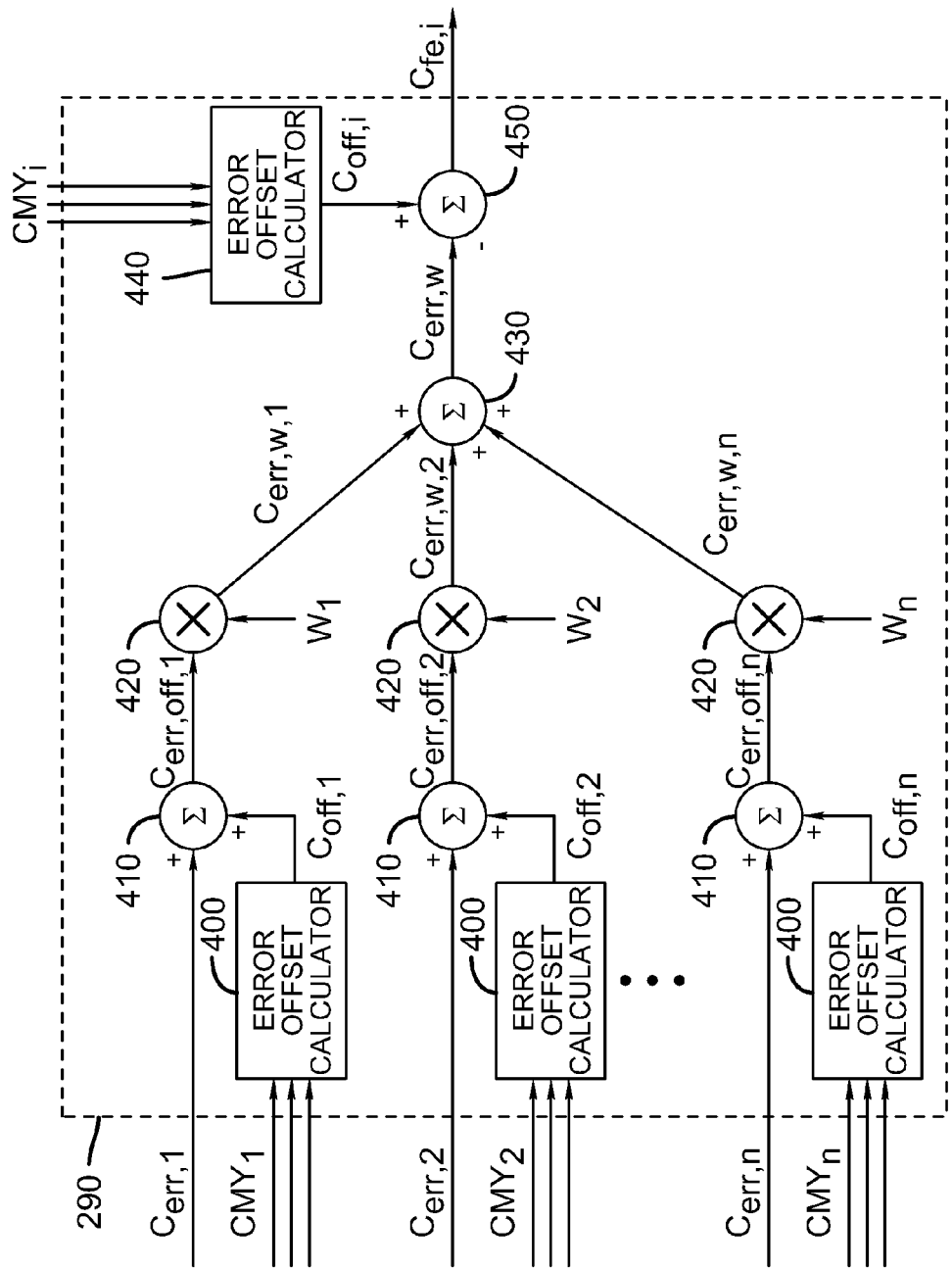
FIG. 9 is a flow diagram showing a weighted error generator.

It has been found that start-up artifacts can be significantly reduced using the method of Couwenhoven et al. by modifying the form of the weighted error generators 290, 300 and 310 shown in FIG. 5. Turning now to FIG. 9, there is shown a preferred embodiment of a weighted error generator 290 for use with the cyan color channel in FIG. 5. Analogous weighted error generators can be used for the other color channels. In this example, n different nearby input pixels (1, 2, ... n) contribute to the formation of the cyan weighted error signal for the $i^{th}$ image pixel $C_{fe,i}$. The error signals for the cyan color channels for the n different nearby input pixels are given by $C_{err,1}, C_{err,2}, \ldots C_{err,n}$.

Error offset calculators 400 are used to compute error signal offset values $C_{off,1}, C_{off,2}, \ldots C_{off,n}$ for each of the n different nearby input pixels, responsive to the input levels for the corresponding nearby input pixels $CMY_1, CMY_2, \ldots CMY_n$. The error signal offset values $C_{off,1}, C_{off,2}, \ldots C_{off,n}$ are added to the error signals $C_{err,1}, C_{err,2}, \ldots C_{err,n}$ using summers 410 to form shifted error signals $C_{err,off,1}, C_{err,off,2}, \ldots C_{err,off,n}$. The shifted error signals $C_{err,off,1}, C_{err,off,2}, \ldots C_{err,off,n}$ are then multiplied by weighting factors $W_1, W_2, \ldots W_n$ using multipliers 420 and combined with a summer 430 to produce a weighted error signal $C_{err,w}$. The weighting factors $W_1, W_2, \ldots W_n$ are commonly called the error diffusion filter coefficients, and control how much error is distributed to each of the nearby image pixels.

Another error offset calculator 440 is used to compute an error signal offset value $C_{off,i}$ responsive to the input levels for the $i^{th}$ image pixel $CMY_i$. Commonly, the error offset calculator 440 will be identical to the error offset calculators 400, although this is not required. The error signal offset $C_{off,i}$ is subtracted from the weighted error signal $C_{err,w}$ using a summer 450 to form a shifted weighted error signal for the $i^{th}$ image pixel $C_{fe,i}$.

Generally, a memory buffer will be used to store the shifted error signals for the $i^{th}$ image pixel $C_{err,off,i}$, so that they can be conveniently accessed when computing the weighted error signals $C_{err,w}$ for nearby image pixels. In a preferred embodiment of the method of Couwenhoven et al., the error offset calculators 400 are adapted to shift the values stored in a memory buffer such that the average shifted error signals over a local region of images pixels are approximately constant and independent of the input levels of the input pixel. For the present discussion, it is assumed that this constant value is zero, but this is not a requirement. The function of the error offset calculator 440 is to compute the appropriate offset value to produce the appropriate average value for the input levels associated with the current image pixel.

Figure 10:
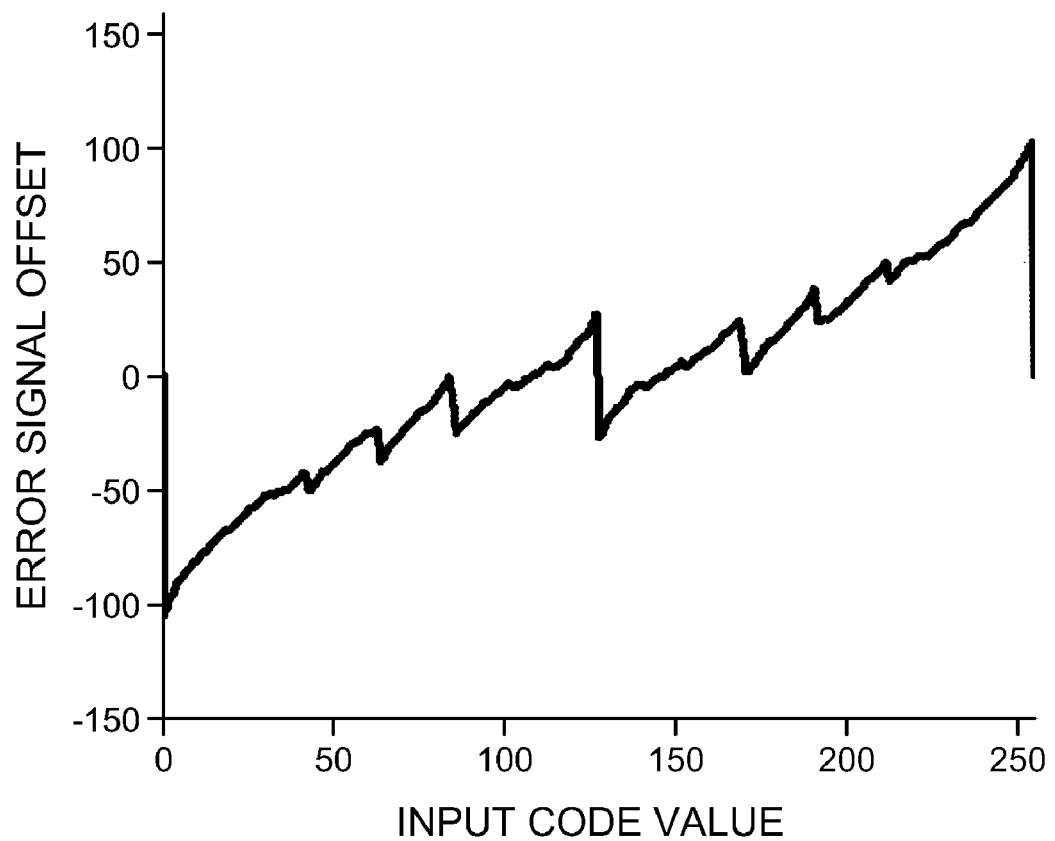
FIG. 10 is a graph showing a typical error signal offset function.

In order to produce shifted errors signals having a mean value of zero, the error signal offset values $C_{off,i}$ computed from the input levels for the corresponding input pixel $CMY_i$, using the error offset calculators 400 and 440 should be approximately equal to the negative of the average value of the error signals $C_{err,i}$ when the error diffusion algorithm is in an equilibrium state. Therefore, if we consider the case when the input image is a pure cyan gradient, the error offset calculators 400 and 440 should produce error signal offset values $C_{off,i}$ that are an inverse of the mean error signal that was shown in FIG. 8. Error signal offset values of this type are shown in FIG. 10. (It should be noted that the form of this function will be somewhat different depending on the exact implementation of the error diffusion algorithm, the values of the error diffusion weights, and the number of output levels, etc.)

Figure 11:
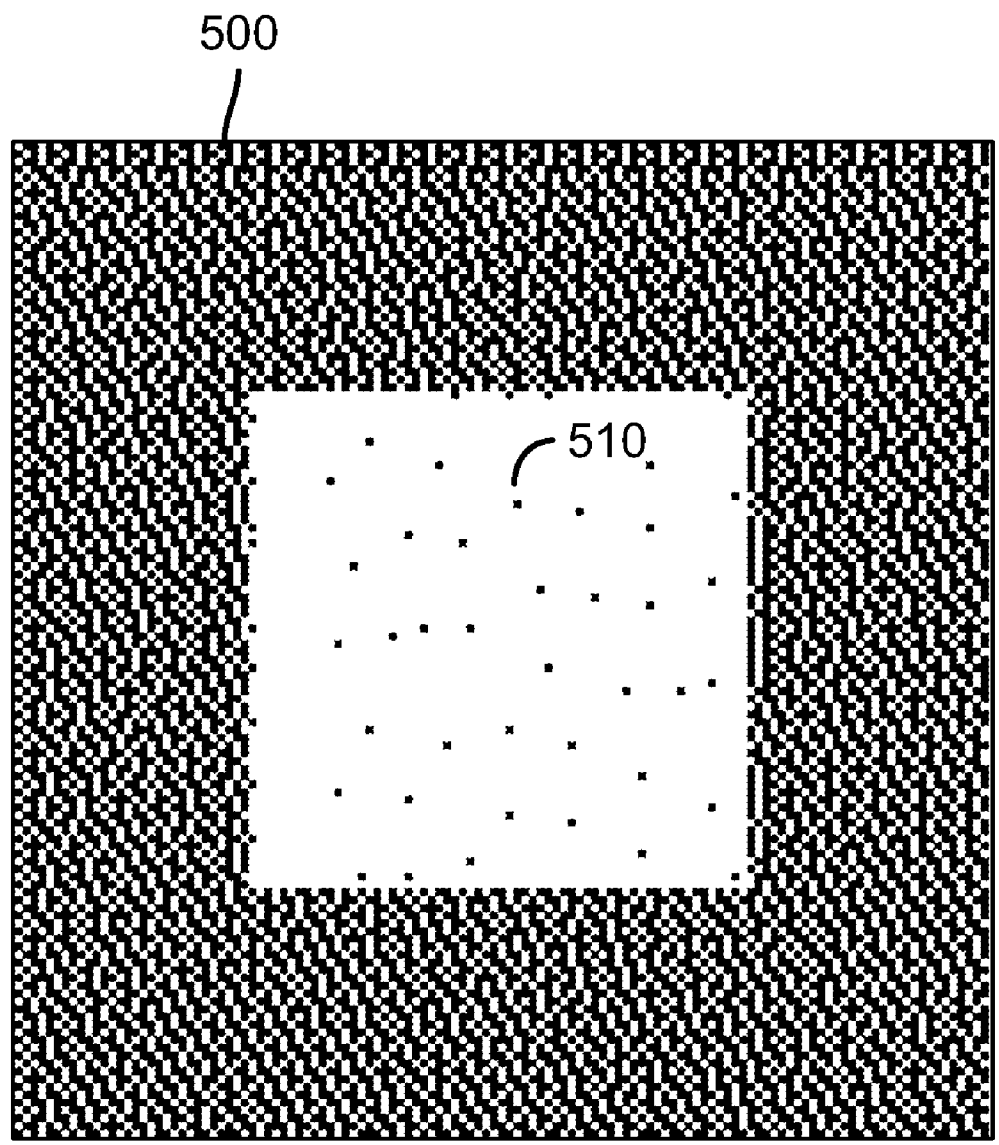
FIG. 11 shows a sample image having reduced start-up artifacts according to a prior art color error diffusion algorithm.
Figure 12:
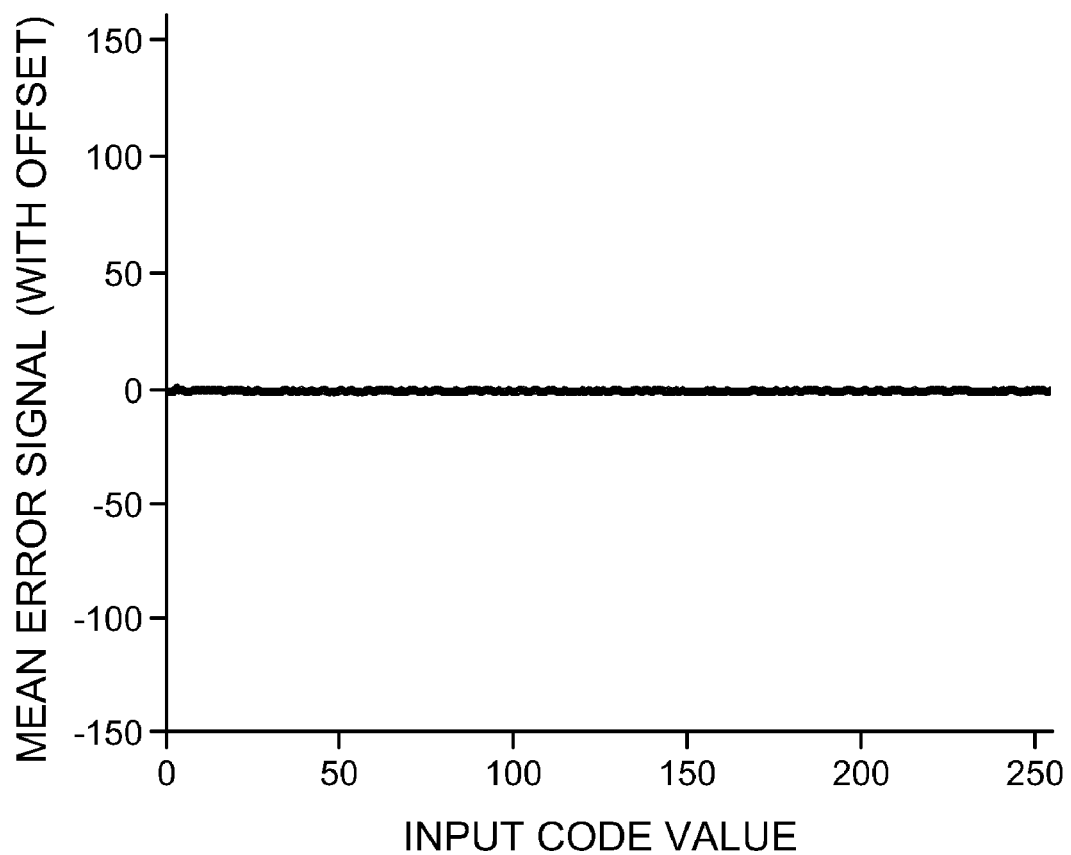
FIG. 12 is a graph showing the mean error signal as a function of input code value according to a prior art color error diffusion algorithm.

FIG. 11 shows an example image created from the same input image that was used for FIG. 7 using the method of the method of Couwenhoven et al. with the error signal offset values shown in FIG. 10. It can be seen that the start-up artifacts have been largely eliminated at the boundaries between the darker image region 500 and the lighter image region 510. FIG. 12 shows a graph of the average values of the shifted error signals as a function of the input code value. Comparing this graph to that shown in FIG. 8, it can be seen that the bias that was associated with the mean error signal has been almost completely eliminated, which is the reason that the start-up artifacts have been greatly reduced.

For the case where the output image has more than two output levels, different error signal offset values need to be used to account for the fact that the mean error signals will be different. It has been found that reasonable error signal offset values can be conveniently determined from those that are optimized for binary output images using an appropriate rescaling function. An equation that represents this rescaling is given by:

$$\text{error signal offset value} = \frac{biasLut[\text{mod}((N_o - 1)C, N_i)]}{(N_o - 1)} \quad (9)$$

where C is the input code value, biasLUT( ) is a look-up table storing the error signal offset values appropriate for a binary output image, $N_i$ is the number of input levels, $N_o$ is the number of output levels, and mod( ) is the modulo function which returns the remainder when the first argument is divided by the second argument. It can be shown that the effect of the rescaling function is to reduce both the period and the amplitude of the error signal offset function by a factor of $(N_o-1)$, and then to repeat the function $(N_o-1)$ times horizontally.

For input colors where more than one color channel has non-zero input values, the error offset calculators 400 and 440 will generally be a function of all of the color channels (at least all of the color channels that are being correlated according to the method of the method of Couwenhoven et al.). It has been found that in many cases, acceptable error signal offset values can be determined by addressing a biasLUT optimized for single channel binary output images using a total input level to determine a total error signal offset value, where the total input level is a sum of the input levels for the input pixel for all of the color channel. The total error signal offset value is then divided among the color channels proportionally to their input values. This process can be expressed in equation form as:

$$\text{error signal offset } value_C = \quad (10)$$
$$biasLut[\text{mod}(C + M + Y), N_i] \frac{C}{(C + M + Y)}$$

where in this case, it is assumed that the input image has three input channels with input values given by C, M and Y. The error signal offset values for the M and Y color channels would be determined using analogous equations. It will be obvious to one skilled in the art that Eq. (10) can be combined with Eq. (9) for the case when there are more than two output levels, and more than one color channel.

While the method of the method of Couwenhoven et al. that has been described above has been found to produce significant image quality improvements relative to the prior art, it does come at the cost of an increase in the computational complexity. In one implementation of this method, it was found that the amount of computation time associated with the halftoning process was increased by about 30% relative to an equivalent error diffusion algorithm that did not incorporate the error signal offsets. This computation impact can be significant for applications where the halftoning process is the rate-limiting step in the imaging chain. Therefore a new variation of this basic algorithm has been developed that delivers image quality benefits very similar to the method of Couwenhoven et al. with a much smaller impact on the computational complexity. In one implementation of the present invention, it was found that the amount of computation time associated with the present algorithm was increased by only about 5% relative to an equivalent error diffusion algorithm that did not incorporate an error signal offset, while maintaining virtually all of the image quality benefits of the method of Couwenhoven et al.

An examination of the computation time associated with the various steps of the method of Couwenhoven et al. found that a significant portion of the additional computation time was incurred in the weighted error generator step 290 shown in FIG. 9, and more specifically to the error offset calculator steps 400. The error offset calculator steps 400 are used to implement the computations shown in Eq. (10). In particular, the step of scaling the offset value by the scale factor C/(C+M+Y) is relatively slow in many software implementations because of the required divide operation. The present invention provides a way for avoiding the costly scaling operation while achieving very similar results, thereby providing substantial speed improvements relative to the method of Couwenhoven et al. In accordance with the invention, it was recognized that after the error offset value is divided and distributed among the color channels by the error offset calculator 400 and added to the error signals, the error offset value is effectively recombined again when the intermediate error signals $C_{qe}$, $M_{qe}$, and $Y_{qe}$ are combined using the summer 190. Therefore, a substantial improvement in the efficiency of the error diffusion algorithm can be realized if the error offset value is directly combined with the intermediate error signals $C_{qe}$, $M_{qe}$, and $Y_{qe}$ rather than splitting it up and recombining it.

A preferred embodiment of the present invention will now be described with reference to FIG. 13. Where elements are common with the prior art algorithm shown in FIG. 5, identical part numbers have been used. The invention will be described as applied to a color image having three color channels, corresponding to cyan (C), magenta (M), and yellow (Y) colorants. It will be understood by one skilled in the art that the invention applies equally well to printers having different colorants, as well as printers having more colorants, such as a CMYK ink set typically found in inkjet printers. The present invention will also be described in the context of a binary inkjet printer that can print either 0 or 1 drops of ink of each color at each pixel, but the fundamental aspects of the invention apply to any printing technology in which a halftoning (or multi-level halftoning using more than 2 output levels) step is employed. Multi-level halftoning is often referred to in the art as multi-toning.

Figure 13:
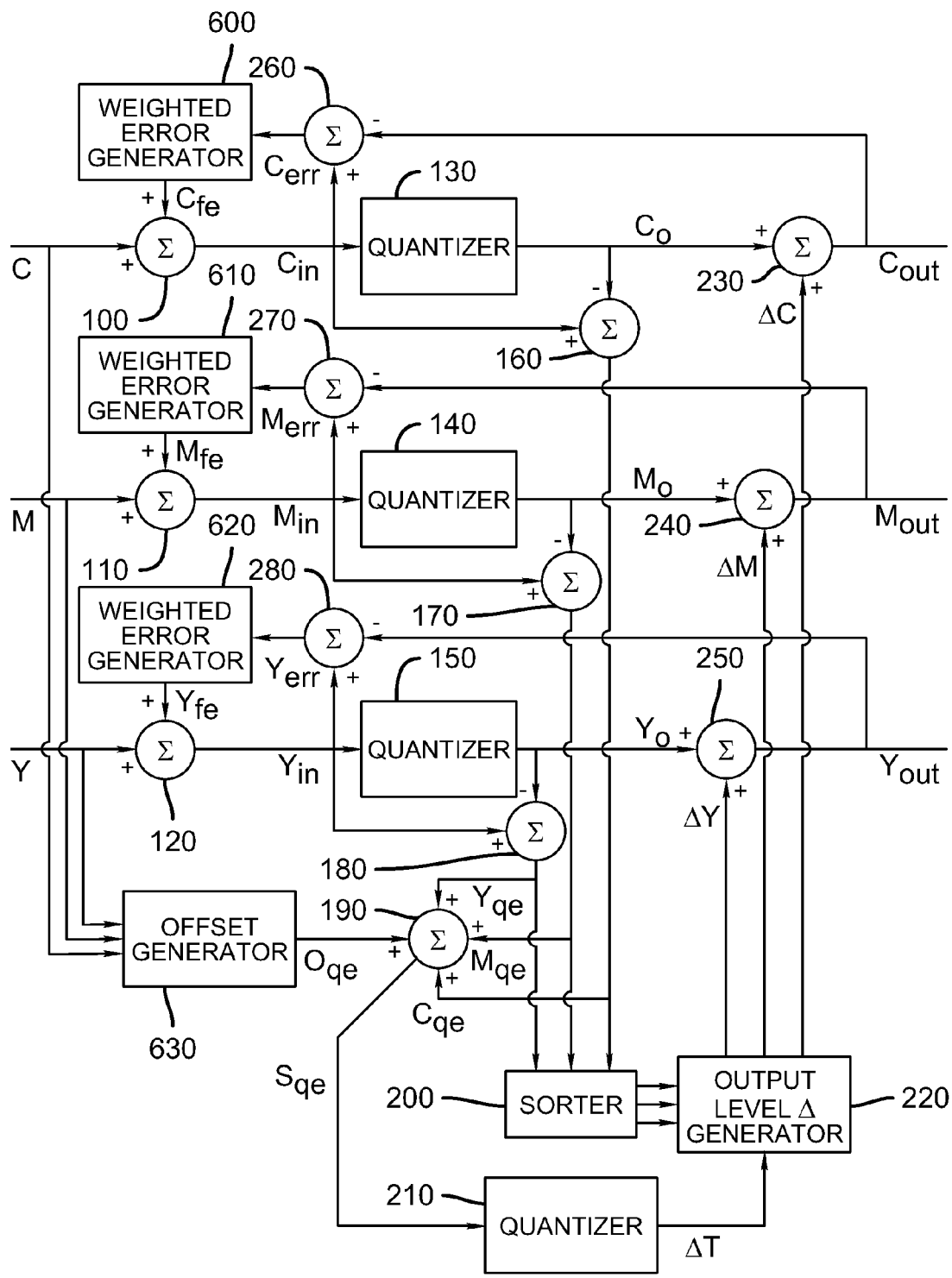
FIG. 13 is a flow diagram showing a color error diffusion algorithm according to a preferred embodiment of the present invention.

Continuous-tone input values for an image having CMY color channels are shown in FIG. 13 by the signals C, M, and Y, respectively, entering the diagram on the left. The input level C, M, or Y is added to a weighted error signal ($C_{fe}$, $M_{fe}$, or $Y_{fe}$ respectively) using summers 100, 110, and 120 to produce modified input levels $C_{in}$, $M_{in}$, and $Y_{in}$ according to:

$$C_{in} = C + C_{fe}$$

$$M_{in} = M + M_{fe}$$

$$Y_{in} = Y + Y_{fe}. \quad (11)$$

(The generation of the weighted error signals $C_{fe}$, $M_{fe}$, and $Y_{fe}$ will be discussed shortly.) The modified input levels $C_{in}$, $M_{in}$, and $Y_{in}$ for the current pixel are quantized using quantizers 130, 140, and 150 to form the quantized output levels $C_o$, $M_o$, and $Y_o$. The function of the quantizers 130, 140, and 150 are to select the nearest available output level less than or equal to the input level for each color channel. (Alternatively, the quantizers 130, 140, and 150 can be adapted to select the nearest available output level.) In a preferred embodiment, the quantizers 130, 140, and 150 are implemented using a look-up table indexed with the input level, which returns the desired output level directly. The construction of this form of quantization look-up table will be understood by one skilled in the art. In another embodiment of the method of Couwenhoven et al., the quantizers 130, 140, and 150 are implemented using an integer division operation, as follows. The modified input level is divided by the quantization interval size, and the integer portion of the result is used as the quantized output level, according to:

$$Q = (N_i - 1)/(N_o - 1)$$

$$Co = \text{int}(C_{in}/Q)$$

$$Mo = \text{int}(M_{in}/Q)$$

$$Yo = \text{int}(Y_{in}/Q) \quad (12)$$

where:
Q is the quantization interval size;
$N_i$ is the number of possible input levels;
$N_o$ is the number of possible output levels; and
$2 \leq N_o < N_i$, and int( ) is the integer function.

Still referring to FIG. 13, after the quantized output levels are determined, summers 160, 170, and 180 are used to compute an intermediate error signal for each color channel according to:

$$C_{qe} = C_{in} - C_o$$

$$M_{qe} = M_{in} - M_o$$

$$Y_{qe} = Y_{in} - Y_o. \quad (13)$$

The intermediate error signal for each color channel represents the difference between the input level and the quantized output level for each color channel caused by the quantizers. Since the number of input levels, $N_i$, and the number of output levels, $N_o$, are different, then it is important to compute the intermediate error signals between appropriately scaled versions of the input level and quantized output levels. For example, if we have $N_i=256$ input levels, and $N_o=2$, then for purposes of computing the intermediate error signal, in a preferred embodiment, the output levels that are used are 0 and 255, instead of 0 and 1. In other words, the input level and the quantized output level need to be scaled to the same data range for computing the intermediate error signals. This will be well understood by one skilled in the art. In another embodiment of the method of Couwenhoven et al., the intermediate error signals $C_{qe}$, $M_{qe}$, and $Y_{qe}$ can be computed using an integer division operation, as follows. The modified input level is divided by the quantization interval size (as computed earlier), and the remainder portion of the result is used as the intermediate error signal, according to:

$$C_{qe} = \text{rem}(C_{in}/Q)$$

$$M_{qe} = \text{rem}(M_{in}/Q)$$

$$Y_{qe} = \text{rem}(Y_{in}/Q) \quad (14)$$

where rem( ) is the remainder function, which returns the portion remaining after the integer division of the argument (e.g., rem(27/5)=2).

Next, an offset generator 630 is used to determine an error signal offset value $O_{qe}$ as a function of the input levels C, M and Y of the input pixel. In a preferred embodiment of the present invention, the error signal offset value $O_{qe}$ can be calculated by addressing a look-up table using a sum of the input levels. In a baseline implementation of the present invention, this operation can be expressed in equation form as:

$$O_{qe} = \frac{bias(Lut[\mathrm{mod}((N_o - 1)(C + M + Y), N_i)]}{(N_o - 1)}.$$

Next, the intermediate error signals $C_{qe}$, $M_{qe}$, and $Y_{qe}$ are then combined with the error signal offset value $O_{qe}$ using a summer 190 to produce a combined error signal $S_{qe}$ according to:

$$S_{qe} = C_{qe} + M_{qe} + Y_{qe} + O_{qe}. \quad (16)$$

As was discussed above with reference to FIG. 5, the intermediate error signals, $C_{qe}$, $M_{qe}$, and $Y_{qe}$, are passed to a sorter 200 which sorts the intermediate error signals into a set of sorted error signals, and the combined error signal, $S_{qe}$, is input to a quantizer 210 which outputs a total output level increment, $\Delta T$. It has been found that the total output level increment can be restricted to be in the range from −1 to +1 by applying a clipping operation to the total output level increment without having a significant impact on the image quality. In this case, the output level for at most one color channel will be modified, thus reducing the required computation time.

Next, an output level delta generator 220 computes output level increments $\Delta C$, $\Delta M$, and $\Delta Y$ responsive to the total output level increment $\Delta T$ and the set of sorted error signals from sorter 200. A preferred embodiment of the output level delta generator 220 was discussed above in reference to the FIG. 5 implementation.

Once the output level increments $\Delta C$, $\Delta M$, and $\Delta Y$ are determined, they are passed along to summers 230, 240, and 250 respectively, wherein modified output levels $C_{out}$, $M_{out}$, and $Y_{out}$ are computed according to:

$$C_{out} = C_o + \Delta C$$

$$M_{out} = M_o + \Delta M$$

$$Y_{out} = Y_o + \Delta Y. \quad (17)$$

The modified output levels $C_{out}$, $M_{out}$, and $Y_{out}$ represent the actual output levels that are printed on the page. Once they are computed, the modified output levels $C_{out}$, $M_{out}$, and $Y_{out}$ are input to summers 260, 270, and 280 respectively, which also receive the modified input levels $C_{in}$, $M_{in}$, and $Y_{in}$, respectively, to produce error signals $C_{err}$, $M_{err}$, and $Y_{err}$ according to:

$$C_{err} = C_{in} - C_{out}$$

$$M_{err} = M_{in} - M_{out}$$

$$Y_{err} = Y_{in} - Y_{out} \quad (18)$$

The error signal for each color channel represents the difference between the modified input level and the modified output level for each color channel caused by the entire color error diffusion process. (As before, since the number of input levels, $N_i$, and the number of output levels, $N_o$, are different, then it is important to compute the error signals between appropriately scaled versions of the modified input level and modified output levels). Once determined, the error signals for each color channel are input to weighted error generators 600, 610, and 620. The weighted error generators perform the function of distributing the error to nearby pixels in the corresponding color channel that have yet to be processed. In a preferred embodiment, the weighted error generator will distribute the error signal for each color channel to input pixels to the right or below the current input pixel in the image, as shown in FIG. 2. Those skilled in the art will recognize that many different error feedback weights can be applied within the scope of the invention, including using different weights or a different number of weights spanning a larger or smaller region of input pixels, and that the selection of the particular error feedback weights is not fundamental to the invention. The weighted error generators 600, 610, and 620 produce weighted error signals $C_{fe}$, $M_{fe}$, and $Y_{fe}$, respectively. In contrast to the method shown in FIG. 5, the weighted error generators 600, 610, and 620 used for the present invention can be simple weighted error generators like those used in conventional error diffusion algorithms since it is not necessary to account for any error offsets in these operations. The weighted error signals are then added to the input levels C, M, and Y of nearby pixels that have yet to be processed using summers 100, 110, and 120, and processing continues with the next pixel in the image.

Figure 14:
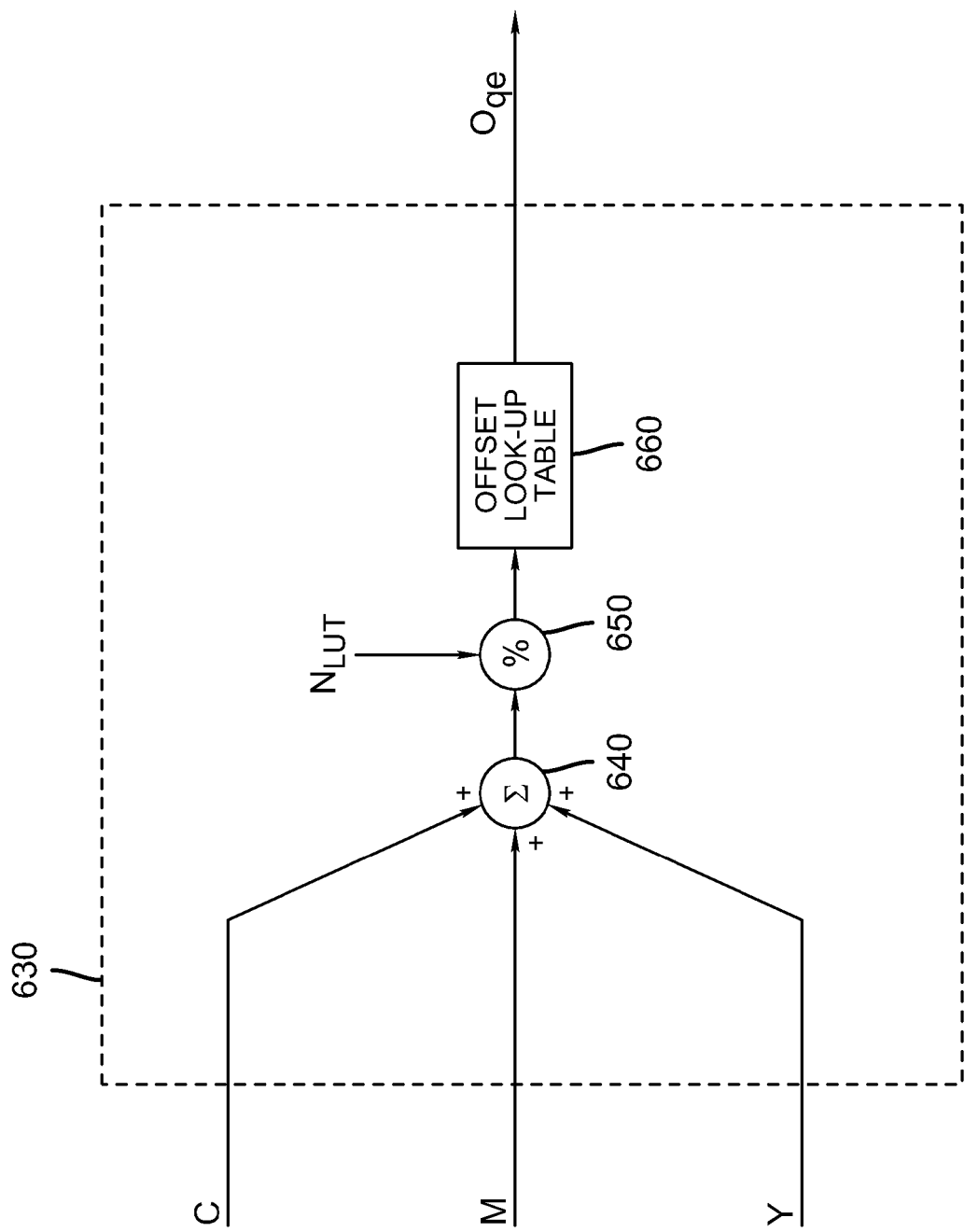
FIG. 14 is a flow diagram showing an offset generator according to the present invention.

A preferred embodiment for the offset generator 630 is shown in FIG. 14. A summer 640 is used to sum the input levels C, M and Y of the input pixel forming a total input level. Next a modulo operator 650 is applied to the total input level to determine a look-up table index for addressing an error signal offset look-up table 660 having a range $N_{LUT}$. The modulo operator 650 determines the remainder when the total input level is divided by the range $N_{LUT}$. The look-up table index is then used to address the error signal offset look-up table 660 to determine the error signal offset value $O_{qe}$. For the case where the output image has more than two output levels, it may be convenient to use an error signal offset look-up table 660 designed for a two-level output configuration and apply appropriate scaling factors to the total input level and the output of the error signal offset look-up table 660 as shown in Eq. (15).

Figure 15:
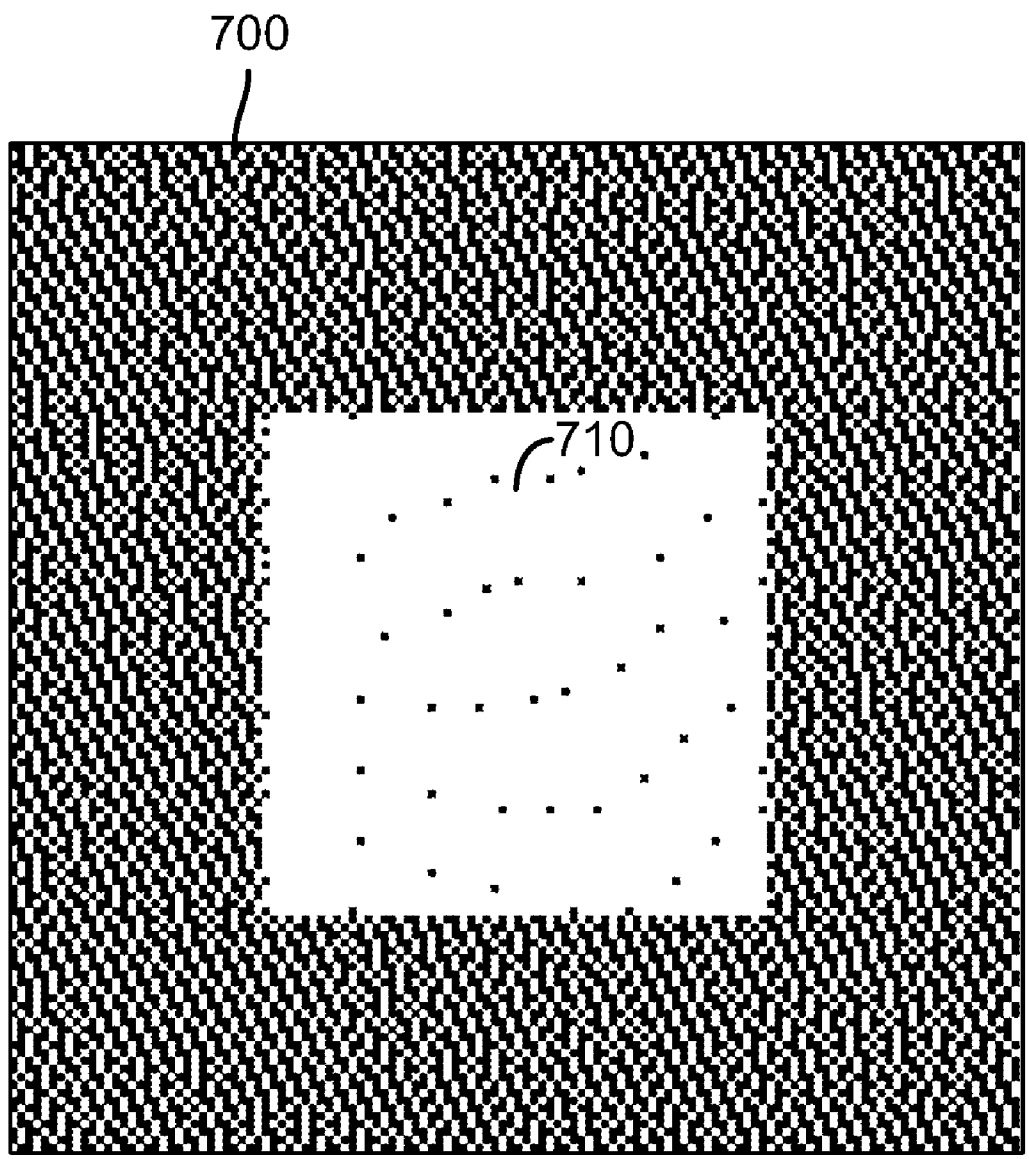
FIG. 15 shows a sample image having reduced start-up artifacts according to the method of the present invention.
Figure 16:
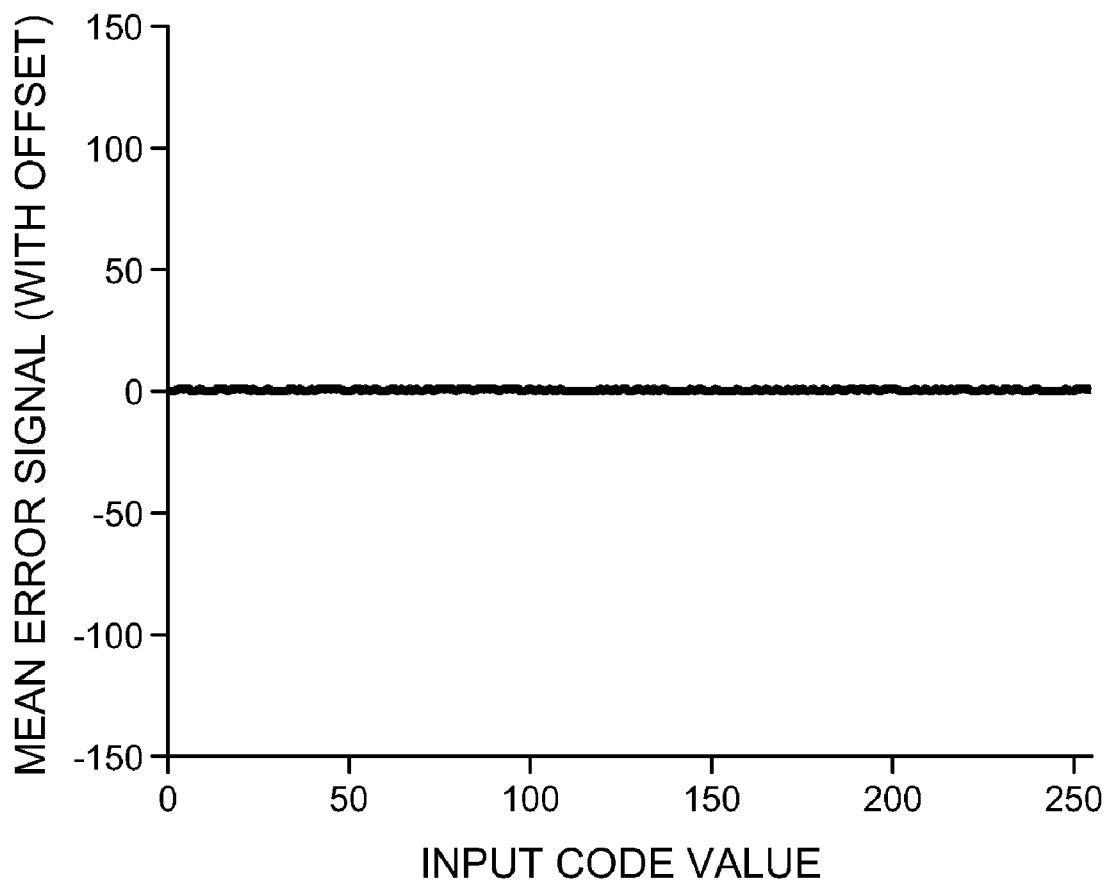
FIG. 16 is a graph showing the mean error signal as a function of input code value according the method of the present invention.

FIG. 15 shows an example image created from the same input image that was used for FIG. 7 using the method of the method of the present invention shown in FIG. 13. It can be seen that the start-up artifacts have been largely eliminated at the boundaries between the darker image region 700 and the lighter image region 710. FIG. 16 shows a graph of the average values of the error signals as a function of the input code value. Comparing this graph to that shown in FIG. 8, it can be seen that the bias that was associated with the mean error signal has been almost completely eliminated, which is the reason that the start-up artifacts have been greatly reduced. Comparing FIG. 15 to FIG. 11, it can be seen that the method of the present invention retains virtually the same image quality advantages as the method of Couwenhoven et al. while eliminating most of the additional computational time relative to a reference error diffusion algorithm having no error signal offsets.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention. For example, the present invention has been described in the context of an inkjet printer which prints with CMY colorants, but in theory the invention should apply to other types of printing technologies also, as well as inkjet printers using different color inks other than CMY, including inkjet printers with CMYK colorants, as well as photo inkjet printers using light density versions of some of the inks in addition to the standard CMYK set.

The present invention can also be equally well applied to printers having multiple output levels, such as an inkjet printer that can produce multiple drop sizes. It is also possible to combine the present invention with other error diffusion techniques, such as Yu, et al., in U.S. Pat. No. 6,271,936.

PARTS LIST 10 summer
20 quantizer
30 summer
40 weighted error generator
50 C dot pattern
60 M dot pattern
70 Y dot pattern
80 CMY dot pattern
100 summer
110 summer
120 summer
130 quantizer
140 quantizer
150 quantizer
160 summer
170 summer
180 summer
190 summer
200 sorter
210 quantizer
220 output level delta generator
230 summer
240 summer
250 summer
260 summer
270 summer
280 summer
290 weighted error generator

PARTS LIST CON'TD 300 weighted error generator
310 weighted error generator
320 C dot pattern
330 M dot pattern
340 Y dot pattern
350 CMY dot pattern
360 darker image region
370 start-up artifact region
380 equilibrium image region
390 start-up artifact region
400 error offset calculators
410 summer
420 multiplier
430 summer
440 error offset calculator
450 summer
500 darker image region
510 lighter image region
600 weighted error generator
610 weighted error generator
620 weighted error generator
630 offset generator
640 summer
650 modulo operator
660 error signal offset look-up table
700 darker image region
710 lighter image region

The invention claimed is:

1. A color printing system having two or more color channels, each color channel having a specified number of printable output levels, $N_o$, for printing input digital images having input pixels with corresponding color channels having a specified number of input levels, $N_i$, where $2 \leq N_o < N_i$, comprising:
   a printing module for printing colorant for the two or more color channels onto a receiver medium;
   a data processor;
   a program memory communicatively connected to the data processing system and storing instructions configured to cause the data processing system to implement a error diffusion method, wherein the color error diffusion method includes:
   a) determining intermediate output levels for each color channel by applying a quantization step to the input levels for the corresponding color channels of an input pixel;
   b) determining intermediate error signals for each color channel responsive to the input levels and intermediate output levels;
   c) determining an error signal offset value as a function of the input levels of the input pixel;
   d) combining the error signal offset value and the intermediate error signals for each color channel to produce a combined error signal;
   e) sorting the intermediate error signals for each color channel to produce a set of sorted error signals;
   f) determining output levels for each color channel of the output pixel responsive to the intermediate output levels, the combined error signal, and the sorted error signals;
   g) determining error signals for each color channel responsive to the input levels and output levels;
   h) weighting the error signals for each color channel to form weighted error signals and adjusting the input levels for the nearby pixels;
   i) repeating steps (a)(-h) for multiple input pixels of the input digital image to thereby provide an output digital image, which is different than the input digital image; and
   j) printing the output digital image using the printing module.

2. The color printing system of claim 1 wherein the error signal offset value is a function of a total input level which is a sum of the input levels for a plurality of color channels for the input pixel.

3. The color printing system of claim 2 wherein the error signal offset value is determined by addressing an error signal offset look-up table using the total input level.

4. The color printing system of claim 3 wherein a modulo operation is applied to the total input level before it is used to address the error signal offset look-up table.

5. The color printing system of claim 1 wherein error signal offset values for cases where $N_o>2$ are calculated from a function adapted to determine error signal offset values for the case where $N_o=2$.

6. The color printing system of claim 1 wherein the combined error signal is determined by summing the error signal offset value and the intermediate error signals for each color channel.

7. The color printing system of claim 1 wherein the combined error signal is used to determine a total output level increment representing the integer number of extra output levels that are desired.

8. The color printing system of claim 7 wherein the total output level increment is restricted to be in the range −1 to +1.

9. The color printing system of claim 7 wherein the output levels are determined by incrementing the intermediate output levels, and wherein the number of output levels to increment is given by the total output level increment and the particular color channels to increment are determined from the sorted error signals.

10. The color printing system of claim 1 wherein the color channels include cyan, magenta and yellow color channels.

11. The color printing system of claim 1 wherein the color channels include a black color channel.

12. The color printing system of claim 1 wherein the printing module is an inkjet printing module adapted to eject drops of ink, and wherein an output pixel of the output digital image is printed by ejecting drops of ink onto the receiver at a particular pixel location, the number of drops of ink for each color channel being given by the output level for the corresponding color channel.

* * * * *